(12) United States Patent
Tie

(10) Patent No.: US 9,121,786 B2
(45) Date of Patent: Sep. 1, 2015

(54) SYSTEM AND METHOD FOR ESTABLISHING CENTER OF GRAVITY

(71) Applicant: Jian-Feng Tie, Shenzhen (CN)

(72) Inventor: Jian-Feng Tie, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 440 days.

(21) Appl. No.: 13/647,447

(22) Filed: Oct. 9, 2012

(65) Prior Publication Data

US 2013/0116806 A1    May 9, 2013

(30) Foreign Application Priority Data

Nov. 7, 2011   (CN) .............................. 201110347957

(51) Int. Cl.
*G06F 17/00* (2006.01)
*G01M 1/12* (2006.01)

(52) U.S. Cl.
CPC .................................... *G01M 1/122* (2013.01)

(58) Field of Classification Search
CPC ...................................................... G01M 1/122
USPC ............................................. 700/90; 702/169
See application file for complete search history.

(56) References Cited

U.S. PATENT DOCUMENTS 8,229,701 B1 * 7/2012 Holz et al. ..................... 702/173
2008/0046168 A1 * 2/2008 McCarthy et al. ............ 701/124

FOREIGN PATENT DOCUMENTS

CN            102169040 A  *  8/2011  .............. G01M 1/12

* cited by examiner

*Primary Examiner* — Sean Shechtman
*Assistant Examiner* — Sivalingam Sivanesan
(74) *Attorney, Agent, or Firm* — Novak Druce Connolly Bove + Quigg LLP

(57) ABSTRACT

A system for establishing a center of gravity of a device under test (DUT) includes a test platform and a control device. The test platform includes three support elements and a marker. A sensor is positioned on top of each support element. The control device includes three processing modules and a central processing unit (CPU). Each sensor senses a pressure of the DUT on a support element, and outputs an analog signal to a processing module. Each processing module converts the analog signal into a digital signal, and outputs the digital signal to the CPU. The CPU controls the marker to make a mark on the DUT when values of three digital signals received from the three processing modules are equal.

9 Claims, 5 Drawing Sheets

SYSTEM AND METHOD FOR ESTABLISHING CENTER OF GRAVITY

BACKGROUND

1. Technical Field

The present disclosure relates to a system for locating and establishing center of gravity.

2. Description of Related Art

In the research and development stage, a center of gravity of an electronic device, such as a chassis of a desktop computer, is desired. Thus, the supports for components within the electronic device can be designed with appropriate strengths. However, it is difficult to find the center of gravity of the electronic device accurately.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references can mean "at least one".

Figure 1:
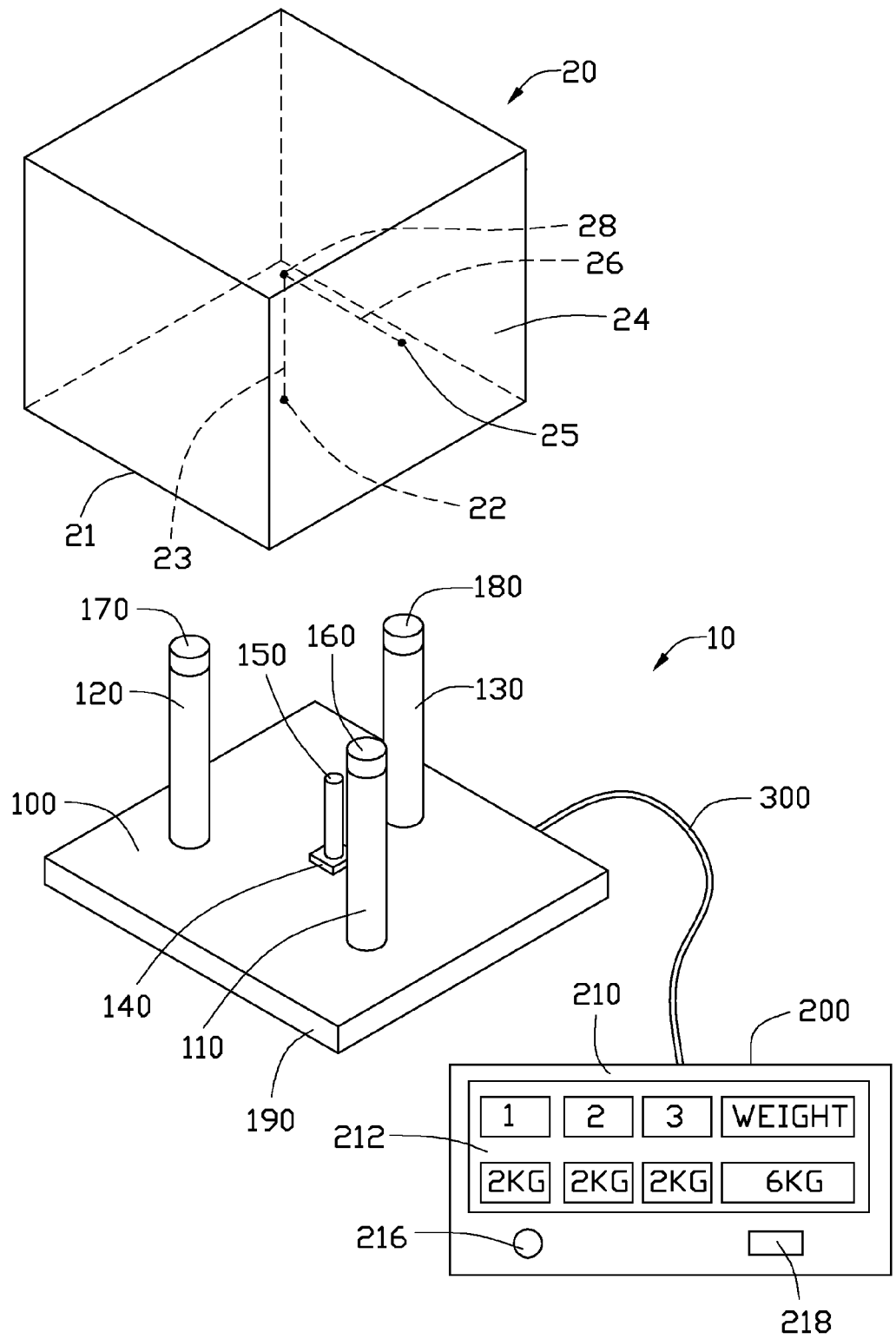
FIG. 1 is a schematic view of a system for establishing a center of gravity of a device under test in accordance with an exemplary embodiment of the present disclosure, wherein the system includes a test platform and a control circuit.
Figure 2:
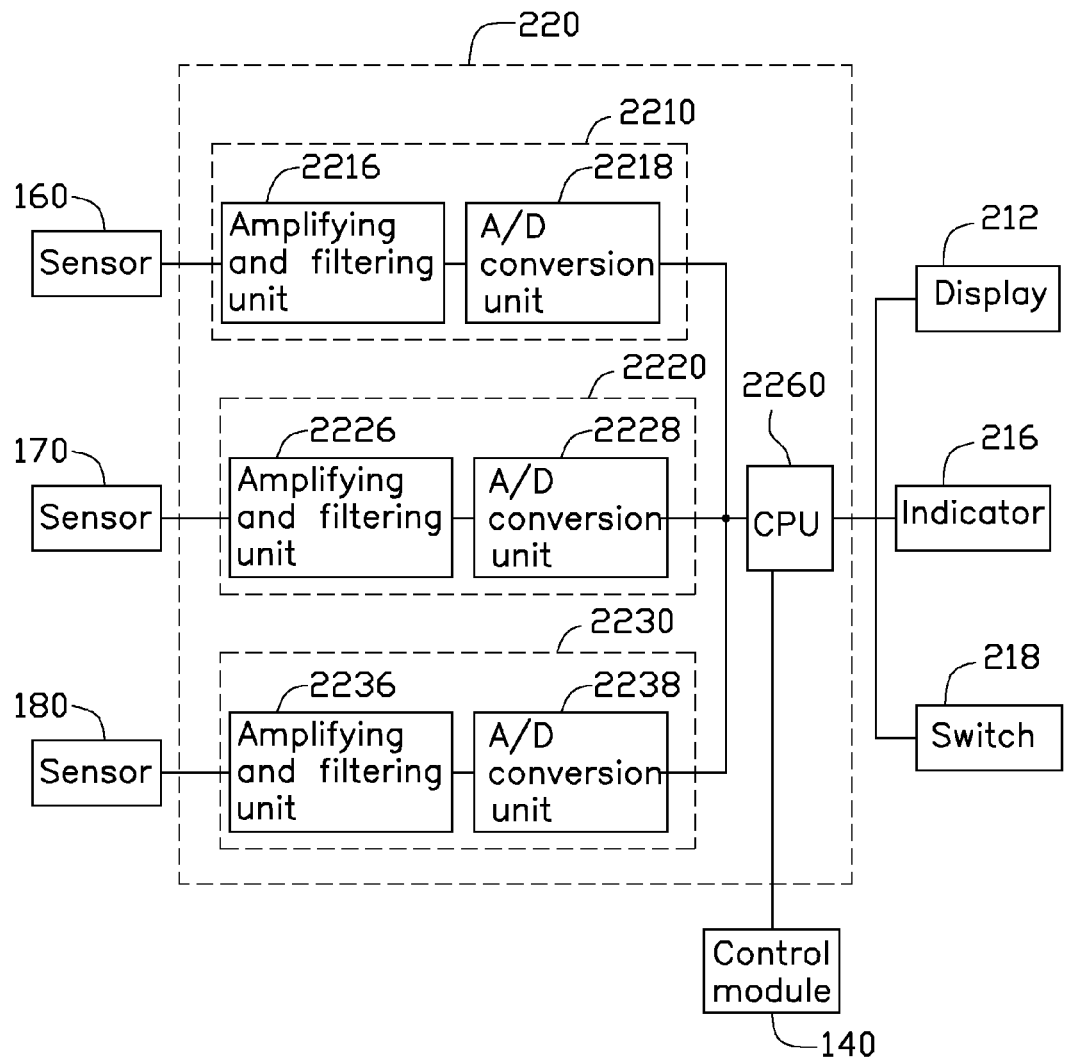
FIG. 2 is a block diagram of the control circuit of FIG. 1.

Referring to FIGS. 1 and 2, an exemplary embodiment of a system 10 used to establish a center of gravity of a device under test (DUT) 20 is shown. The system 10 includes a test platform 100 and a control device 200. In one embodiment, the DUT 20 includes at least two intersecting planes, 21 and 24, and the DUT 20 may be a chassis of a desktop computer.

The test platform 100 includes a base board 190, three support elements 110, 120, and 130, a control module 140, and a telescoping marker 150. The support elements 110-130 extend up from the base board 190 and their bases are arranged in an equilateral triangle on the base board 190. The control module 140 is arranged on the base board 190 and surrounded by the support elements 110-130. The marker 150 is movably assembled on the control module 140 to extend and retract. The marker 150 is equidistant from all the support elements 110-130. The control module 140 is electrically connected to the marker 150, and electrically connected to the control device 200 through a cable 300. A sensor 160 is positioned on a top of the support element 110, and electrically connected to the control device 200 through the cable 300. A sensor 170 is positioned on a top of the support element 120, and electrically connected to the control device 200 through the cable 300. A sensor 180 is positioned on a top of the support element 130, and electrically connected to the control device 200 through the cable 300. The support elements 110-130 support the DUT 20. The sensors 160, 170, and 180 sense pressures applied on their respective support elements 110-130, and respectively output a first, a second, and a third analog signal to the control device 200 through the cable 300. The control module 140 controls the marker 150 to extend and retract. In one embodiment, the height of all the support elements 110-130 perpendicularly positioned on the base board 190 is the same, a starting height of the marker 150 is lower than the height of the support elements 110-130.

The control device 200 includes a main body 210 and a control circuit 220 received in the main body 210. The main body 210 includes a display 212, an indicator 216, and a switch 218. The control circuit 220 includes three processing modules 2210, 2220, and 2230, and a central processing unit (CPU) 2260 (see FIG. 2). The processing module 2210 includes an amplifying and filtering unit 2216 and an analog to digital (A/D) conversion unit 2218. The processing module 2220 includes an amplifying and filtering unit 2226 and an A/D conversion unit 2228. The processing module 2230 includes an amplifying and filtering unit 2236 and an A/D conversion unit 2238. The amplifying and filtering unit 2216 is connected to the sensor 160, and connected to the A/D conversion unit 2218. The amplifying and filtering unit 2226 is connected to the sensor 170, and connected to the A/D conversion unit 2228. The amplifying and filtering unit 2236 is connected to the sensor 180, and connected to the A/D conversion unit 2238. The CPU 2260 is connected to the A/D conversion units 2218, 2228, and 2238, and connected to the control module 140, the display 212, the indicator 216, and the switch 218.

The amplifying and filtering unit 2216 is used to amplify and filter the first analog signal received from the sensor 160, and outputs the amplified and filtered first analog signal to the A/D conversion unit 2218. The A/D conversion unit 2218 is used to convert the amplified and filtered first analog signal into a first digital signal, and output the first digital signal to the CPU 2260. The amplifying and filtering unit 2226 is used to amplify and filter the second analog signal received from the sensor 170, and output the amplified and filtered second analog signal to the A/D conversion unit 2228. The A/D conversion unit 2228 is used to convert the amplified and filtered second analog signal into a second digital signal, and output the second digital signal to the CPU 2260. The amplifying and filtering unit 2236 is used to amplify and filter the third analog signal received from the sensor 180, and output the amplified and filtered third analog signal to the A/D conversion unit 2238. The A/D conversion unit 2238 is used to convert the amplified and filtered third analog signal into a third digital signal, and output the third digital signal to the CPU 2260.

The CPU 2260 controls the display 212 and the indicator 216 to give information corresponding to the first, second, and third digital signals, and outputs a control signal to the control module 140 when values of the first, second, and third digital signals are equal. The control module 140 controls the marker 150 to extend to make a mark on the DUT 20 after receiving the control signal, and controls the marker 150 to retract to the starting height of the marker 150 after making the mark. The display 212 displays values of the pressures sensed by the sensors 160-180 and a sum of the three pressure values (as shown in FIG. 1, where each of the sensors 160-180 senses 2 kilograms (KG) of pressure, and the sum of the three pressure values is therefore 6 KG).

The indicator 216 indicates whether the three pressure values are equal. The switch 218 turns on and turns off the control device 200. In one embodiment, the indicator 216 is a light-emitting diode (LED), the LED illuminates to indicate that the three pressure values are equal, and the LED does not illuminate if the three pressure values are not equal. The CPU 2260 controls the display 212 to display the value of pressure sensed by each of the sensors 160-180 and the sum of the three pressure values according to the first, second, and third digital signals, and the sum is the weight of the DUT 20.

Figure 3:
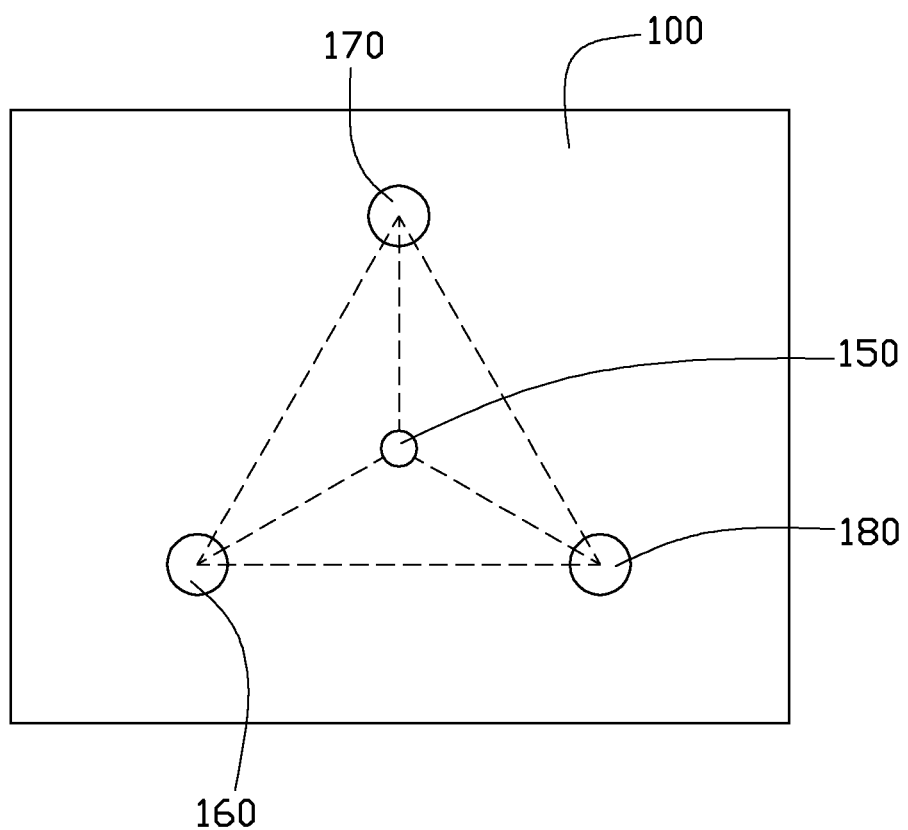
FIG. 3 is a plan view of the test platform of FIG. 1.

Referring to FIG. 3, the support elements 110-130 are positioned on the base board 190 and at three vertices of an equilateral triangle (indicated by dashed lines). The marker 150 is assembled on the control module 140 and at the center of the equilateral triangle.

In test, the DUT 20 is placed on the test platform 20, with the plane 21 supported on the sensors 160-180. The switch 218 is pressed to power on the control device 200. When the pressures sensed by the sensors 160-180 are equal, the CPU 2260 outputs a first control signal to the control module 140. The control module 140 controls the marker 150 to extend to make a mark 22 on the plane 21. A first line 23 perpendicular to the plane 21 at the mark 22 is obtained. The DUT 20 is turned, with the plane 24 supported on the sensors 160-180. When the pressures sensed by the sensors 160-170 are equal, the CPU 2260 outputs a second control signal to the control module 140. The control module 140 controls the marker 150 to extend to make a mark 25 on the plane 24. A second line 26 perpendicular to the plane 24 at the mark 25 is obtained. An intersection 28 of the first line 23 and the second line 26 will be the center of gravity of the DUT 20.

Figure 4A:
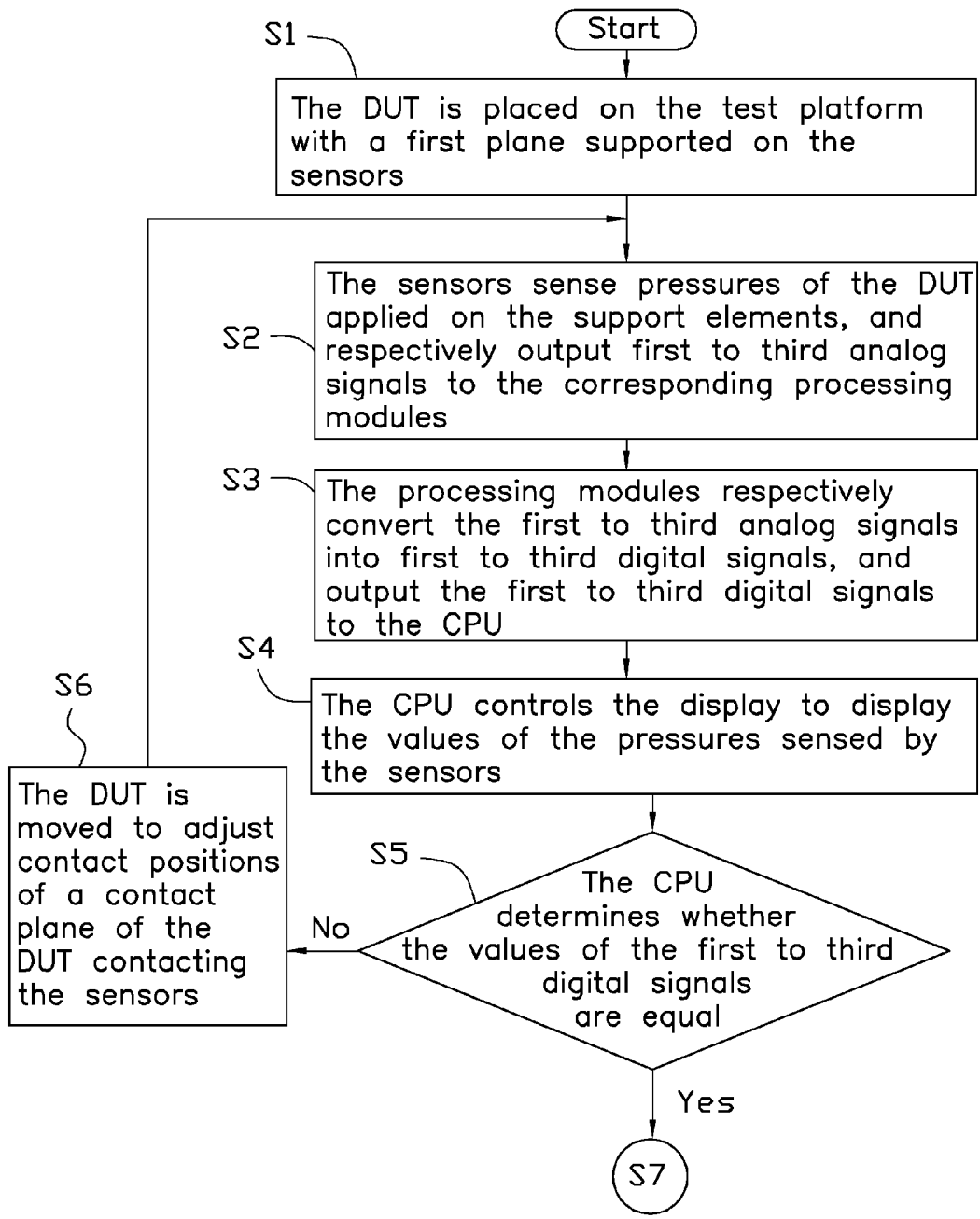
FIGS. 4A and 4B are flowcharts of a method for establishing a center of gravity of a device under test in accordance with an exemplary embodiment of the present disclosure.
Figure 4B:
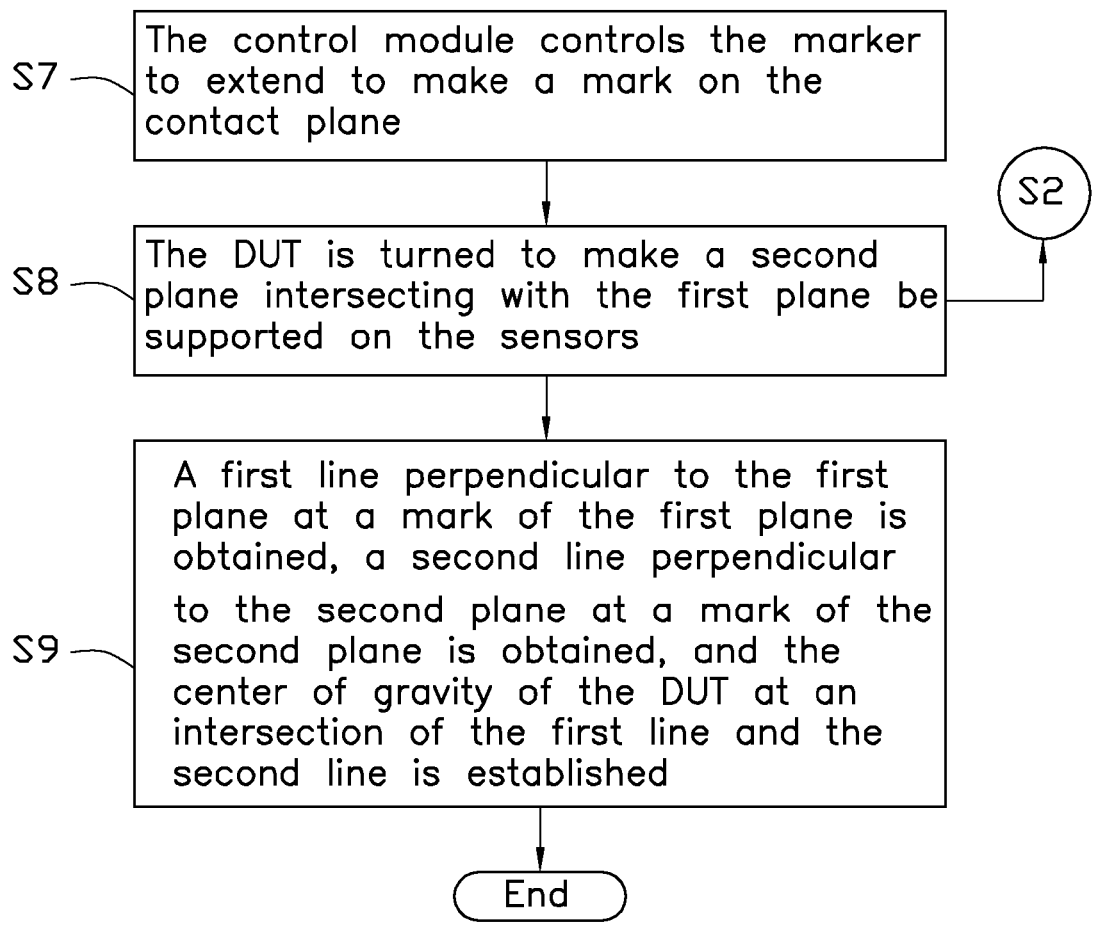

Referring to FIGS. 4A and 4B, an exemplary embodiment of a method for establishing a center of gravity of a device under test (DUT) 20 includes the following steps.

In step S1, the control device 200 is turned on by operating the switch 218, and the DUT 20 is placed on the test platform 20, with the plane 21 supported on the sensors 160-180.

In step S2, the sensors 160-180 sense pressures of the DUT 20 applied on the support elements 110-130, and respectively output a first, a second, and a third analog signal to the processing modules 2210-2230.

In step S3, the processing modules 2210-2230 respectively convert the first to third analog signals into a first, a second, and a third digital signal, and output the first to third digital signals to the CPU 2260. Specifically, the first analog signal is amplified and filtered by the amplifying and filtering unit 2216, and converted into the first digital signal by the A/D conversion unit 2218. The A/D conversion unit 2218 outputs the first digital signal to the CPU 2260. The second analog signal is amplified and filtered by the amplifying and filtering unit 2226, and converted into the second digital signal by the A/D conversion unit 2228. The A/D conversion unit 2228 outputs the second digital signal to the CPU 2260. The third analog signal is amplified and filtered by the amplifying and filtering unit 2236, and converted into the third digital signal by the A/D conversion unit 2238. The A/D conversion unit 2238 outputs the third digital signal to the CPU 2260.

In step S4, the CPU 2260 controls the display 212 to display the values of pressure sensed by the sensors 160-180 and the sum of the values.

In step S5, a determination is made by the CPU 2260 as to whether the values of the first to third digital signals are equal. If the values of the first to third digital signals are not equal, step S6 is executed. If the values of the pressures are equal, step S7 is executed.

In step S6, the DUT 20 is moved to adjust contact positions of a contact plane of the DUT 20 contacting the sensors 160-180, and the process returns to step S2. In one embodiment, when the plane 21 contacts the sensors 160-180, the plane 21 is deemed the contact plane, and when the plane 24 contacts the sensors 160-180, the plane 24 is deemed the contact plane.

In step S7, the CPU 2260 controls the indicator 216 to illuminate and outputs a control signal to the control module 140 to control the marker 150 to extend and make a mark 22 on the contact plane 21.

In step S8, the DUT 20 is turned to make the plane 24 intersecting with the plane 21 be supported on the sensors 160-180, and steps S2-S7 are executed to obtain the mark 25 on the plane 24.

In step S9, the first line 23 perpendicular to the plane 21 at the mark 22 is obtained, and the second line 26 perpendicular to the plane 24 at the mark 25 is obtained, thus the center of gravity of the DUT 20 which is located at the intersection 28 of the first line 23 and the second line 26 can be established.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A system to establish a center of gravity of a device under test (DUT), the system comprising:
   a test platform comprising:
      a base board;
      three support elements positioned on the base board, and arranged at three vertices of an equilateral triangle;
      a telescoping marker movably assembled on the base board to extend and retract, and located at the center of the equilateral triangle; and
      three sensors respectively positioned on tops of the three support elements; and
   a control device comprising:
      three processing modules respectively connected to the three sensors;
      a central processing unit (CPU) connected to the processing modules and the marker; and
      a display connected to the CPU;
   wherein each sensor senses a pressure of the DUT applied on a corresponding support element, and outputs an analog signal to a corresponding processing module; each processing module converts the received analog signal into a digital signal, and outputs the digital signal to the CPU; the CPU controls the display to display values of pressures sensed by the three sensors according to the digital signals received from the three processing modules, determines whether the values of the digital signals are equal, and controls the marker to extend to make a mark on a contact plane of the DUT contacting the sensors;
   wherein in response to a first contact plane of the DUT being supported on the three sensors and the values of the three digital signals being equal, the CPU controls the marker to extend to make a first mark on the first contact plane;
   wherein in response to a second contact plane intersecting with the first contact plane be supported on the three sensors and the values of the three digital signals being equal, the CPU controls the marker to extend to make a second mark on the second contact plane; and
   wherein a first line perpendicular to the first contact plane at the first mark is obtained, a second line perpendicular to the second contact plane at the second mark is obtained, and the center of gravity of the DUT at an intersection of the first line and the second line is obtained.

2. The system of claim 1, wherein the three support elements perpendicularly extend up from the base board, height of the three support elements is the same, a starting height of the marker is lower than the height of the three support elements.

3. The system of claim 2, wherein the test platform further comprises a control module electrically connected to the marker and the CPU, the CPU outputs a control signal to the control module in response to the values of the digital signals being equal, the control module controls the marker to extend to make a mark on the contact plane of the DUT contacting the sensors after receiving the control signal, and controls the marker to retract to the starting height of the marker after marking the mark.

4. The system of claim 1, wherein each processing module comprises an amplifying and filtering unit and an analog to digital (A/D) conversion unit, each amplifying and filtering unit is connected to a corresponding sensor and a corresponding A/D conversion unit, each A/D conversion unit is connected to the CPU, each amplifying and filtering unit amplifies and filters the analog signal received from the corresponding sensor, and outputs the amplified and filtered analog signal to the corresponding A/D conversion unit, each A/D conversion unit converts the amplified and filtered analog signal received from a corresponding amplifying and filtering unit into a digital signal, and outputs the digital signal to the CPU.

5. The system of claim 1, wherein the control device further comprises a main body, the processing modules and the CPU are received in the main body, the display is positioned on the main body.

6. The system of claim 5, wherein the main body further comprises a switch to power on or power off the control device, and an indicator, the indicator is operable to indicate whether the values of pressures sensed by the sensors are equal, and the indicator is lit by the CPU in response to the values of pressures sensed by the sensors are equal.

7. The system of claim 1, wherein the CPU controls the display to display a sum of the values of pressures sensed by the sensors.

8. A method to establish a center of gravity of a device under test (DUT), the method comprising:
providing a system comprising:
a test platform comprising:
a base board;
three support elements positioned on the base board, and arranged at three vertices of an equilateral triangle;
a telescoping marker movably assembled on the base board to extend and retract, and located at the center of the equilateral triangle; and
three sensors respectively positioned on top surfaces of the three support elements; and
a control device comprising:
three processing modules respectively connected to the three sensors;
a central processing unit (CPU) connected to the three processing modules and the marker; and
a display connected to the CPU;
placing a first contact plane of the DUT on the three sensors;
sensing a pressure of the DUT applied on a corresponding support element and outputting an analog signal to a corresponding processing module by each sensor;
converting the analog signal received from a corresponding sensor into a digital signal, and outputting the digital signal to the CPU by each processing module;
controlling the display to display values of pressures sensed by the three sensors according to the three digital signals received from the three processing modules;
determining whether the values of the three digital signals are equal;
adjusting contact positions of the first contact plane of the DUT contacting the three sensors in response to the values of the three digital signals being not equal, and the sensing step is repeated;
controlling the marker to extend to make a first mark on the first contact plane of the DUT contacting the three sensors in response to the values of the three digital signals being equal;
turning the DUT to make a second contact plane intersecting with the first contact plane be supported on the three sensors, and the sensing step is executed to obtain a second mark on the second contact plane; and
obtaining a first line perpendicular to the first contact plane at the first mark, obtaining a second line perpendicular to the second contact plane at the second mark, and obtaining the center of gravity of the DUT at an intersection of the first line and the second line.

9. The method of claim 8, further comprising:
controlling the display to display a sum of the values of pressures sensed by the three sensors according to the three digital signals received from the three processing modules.

* * * * *